(12) United States Patent
Zhang et al.

(10) Patent No.: US 9,611,197 B1
(45) Date of Patent: Apr. 4, 2017

(54) METHOD OF REMOVING UNDESIRABLE SOLID COMPONENTS FROM A RENEWABLE OR NON-RENEWABLE FEED AND APPARATUS USED IN SAME

(71) Applicant: KiOR, Inc., Pasadena, TX (US)

(72) Inventors: Changan Zhang, Houston, TX (US); Ronny W. Lin, Sugar Land, TX (US); Lorenz J. Bauer, Pasadena, TX (US); Ronald Cordle, League City, TX (US)

(73) Assignee: Inaeris Technologies, LLC, Pasadena, TX (US)

( * ) Notice: Subject to any disclaimer, the term of this patent is extended or adjusted under 35 U.S.C. 154(b) by 357 days.

(21) Appl. No.: 14/213,438

(22) Filed: Mar. 14, 2014

Related U.S. Application Data

(60) Provisional application No. 61/801,361, filed on Mar. 15, 2013.

(51) Int. Cl.
*C07C 7/144* (2006.01)
*B01D 24/00* (2006.01)

(52) U.S. Cl.
CPC ............ *C07C 7/144* (2013.01); *B01D 24/007* (2013.01)

(58) Field of Classification Search
None
See application file for complete search history.

(56) References Cited

U.S. PATENT DOCUMENTS

| 3,557,955 A | 1/1971 | Hirs et al. |
| 6,409,912 B1 | 6/2002 | Wallace et al. |
| 6,579,443 B1 | 6/2003 | Iaccino et al. |
| 7,004,999 B2 | 2/2006 | Johnson et al. |
| 7,867,382 B2 | 1/2011 | Droughton |
| 7,905,990 B2 | 3/2011 | Freel |
| 2009/0250376 A1 | 10/2009 | Brandvold et al. |
| 2011/0119994 A1 | 5/2011 | Hogendoorn et al. |
| 2011/0138681 A1* | 6/2011 | Ramirez Corredores ............ C10L 1/023 44/350 |
| 2011/0146135 A1 | 6/2011 | Brandvold |
| 2012/0012451 A1* | 1/2012 | Lin ........................ C10B 49/22 201/3 |
| 2012/0017493 A1 | 1/2012 | Traynor et al. |
| 2012/0053377 A1 | 3/2012 | Mizan et al. |
| 2012/0137571 A1 | 6/2012 | Brady et al. |
| 2012/0323057 A1 | 12/2012 | Heinerman et al. |
| 2015/0051428 A1* | 2/2015 | Dayton .................. C10B 53/02 585/242 |
| 2015/0110680 A1 | 4/2015 | Lin |
| 2015/0307786 A1* | 10/2015 | Dayton .................. C10G 1/086 201/2.5 |

FOREIGN PATENT DOCUMENTS

WO WO 2010/075429 A1 7/2010

OTHER PUBLICATIONS

A.V. Bridgwater, "Renewable Fuels and Chemicals by Thermal Processing of Biomass", Chem. Eng. J. 91, pgs. 87-102 (2003).

* cited by examiner

*Primary Examiner* — Tam M Nguyen
(74) *Attorney, Agent, or Firm* — John Wilson Jones; Jones Delflache LLP

(57) ABSTRACT

A filter media for the removal of undesirable solid components from a fuel feedstock contains biomass and a catalyst used from the thermocatalytic conversion of biomass into bio-oil.

24 Claims, 1 Drawing Sheet

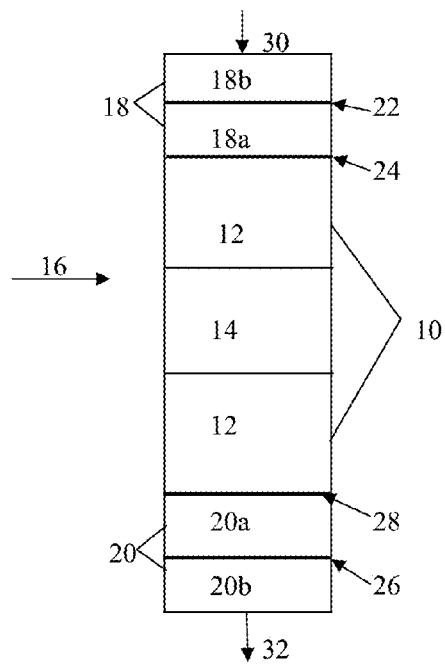
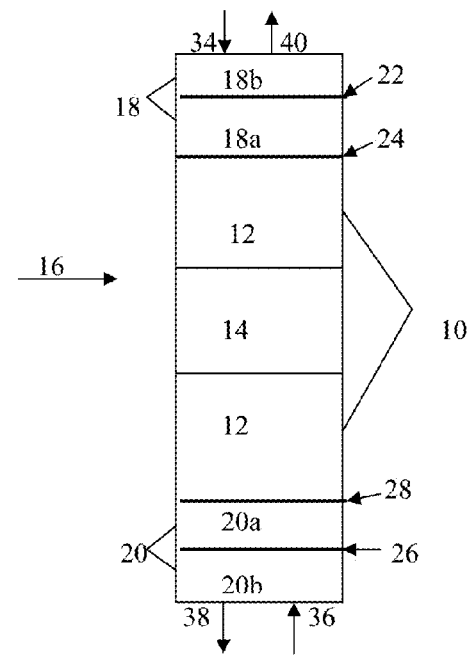
FIG. 1    FIG. 2
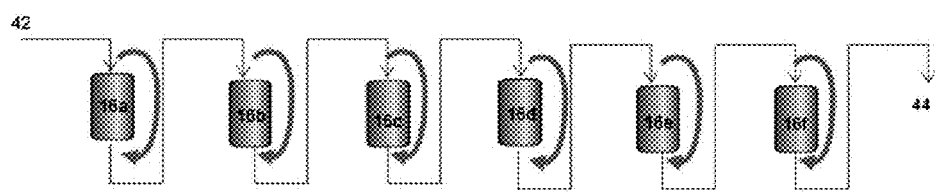
FIG. 3

METHOD OF REMOVING UNDESIRABLE SOLID COMPONENTS FROM A RENEWABLE OR NON-RENEWABLE FEED AND APPARATUS USED IN SAME

This application claims the benefit of U.S. patent application Ser. No. 61/801,361, filed on Mar. 15, 2013, herein incorporated by reference.

FIELD OF THE DISCLOSURE

The disclosure relates to a method of removing undesirable solid components from a renewable or non-renewable fuel feedstock and to an apparatus that may be used in such a method.

BACKGROUND OF THE DISCLOSURE

Renewable energy sources, such as biofuels, provide a substitute for fossil fuels and a means of reducing dependence on petroleum oil. In light of its low cost and wide availability, biomass is often used as a feedstock to produce bio-oil which, in turn, is used to produce biofuel.

Many different conversion processes have been developed for converting biomass to bio-oil. Existing biomass conversion processes include, for example, combustion, gasification, slow pyrolysis, fast pyrolysis, liquefaction and enzymatic conversion. Such conversion processes render liquid products that spontaneously separate into an aqueous phase and an organic phase. Bio-oil consists of the organic phase. Bio-oil may be processed into transportation fuels as well as into hydrocarbon chemicals and/or specialty chemicals.

While thermolysis processes and other conversion processes produce high yields of bio-oil, most, if not all, of the bio-oil produced is of low quality due to the presence of high levels of reactive organic molecules as well as solids including char, inorganics from biomass, scale from processing equipment and fines from heat transfer agents and catalysts. Also, the amount of dissolved metal in bio-oil greatly exceeds that of typical fossil fuels. This is likely attributable to the acidic nature of bio-oil which is capable of leaching and solubilizing cationic species.

Bio-oils thus require extensive secondary upgrading in order to be utilized as transportation fuels and/or as fuel additives. In one such method, bio-oils are subjected to a filtering process in order to remove undesirable solid particles. Since the residual solids often contain fine particles of less than 30 microns in size, fine-scale filters are required. Most filters capable of removing residual solids from bio-oil are rapidly clogged by gelatinous-type solids found in bio-oil. This rapid clogging can cause residual solids filtration methods to be expensive and challenging to scale up.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

Accordingly, there exists a need for improvements in methods and apparatus for the removal of residual solids from a fuel feedstream, such as bio-oil, having one or more of the attributes or capabilities described or shown in, or as may be apparent from, the other portions of this patent.

SUMMARY OF THE DISCLOSURE

In an embodiment of the disclosure, a filter media for the removal of undesirable solid components from a fuel feedstock is disclosed which contains biomass and a catalyst used from the thermocatalytic conversion of biomass into bio-oil.

In another embodiment of the disclosure, a method of removing undesirable solid components from a fuel feedstock stream is disclosed wherein at least a portion of the feedstock stream is passed through a filter media which contains biomass and a used catalyst from the thermocatalytic conversion of biomass into bio-oil.

Accordingly, the present disclosure includes features and advantages which are believed to enable it to advance the removal of undesirable solids from a fuel feedstock. Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein:

FIG. 1 illustrates a filter media disclosed herein and further illustrates a filtration bed containing the filter media having a single port of entry for the fuel feedstock.

FIG. 2 illustrates a filter media disclosed herein and further illustrates shows a filtration bed containing the filter media having more than one single port of entry.

FIG. 3 illustrates a system described illustrating a multitude of filtration beds in series.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure and referring to the accompanying figures. It should be understood that the description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

In showing and describing preferred embodiments in the appended figures, common or similar elements are referenced with like or identical reference numerals or are apparent from the figures and/or the description herein. The figures are not necessarily to scale and certain features and certain views of the figures may be shown exaggerated in scale or in schematic in the interest of clarity and conciseness.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The disclosure provides an improved filter aid, a filtration bed containing the filter and a method of using the filter aid and at least one filtration bed in the removal of residual solids from fuel feedstock including bio-oil.

Undesirable components may be removed from a fuel feedstock by passing the fuel feedstock through a filter media. The filter media may comprise biomass and a catalyst. The catalyst is one used in the thermocatalytic conversion of biomass into bio-oil. In a preferred embodiment, the catalyst is a used catalyst which has already been used in the thermocatalytic conversion of biomass into bio-oil.

The feedstock stream which is passed through the filter media may be a feedstock for producing a renewable fuel such as bio-fuel as well as a non-renewable fuel. For instance, the feedstock passed through the filter media may be a feedstock for producing a non-renewable distillate such as one produced by a Fischer-Tropsch process including a petroleum distillate having a boiling point of gasoline, light diesel, jet fuel, kerosene or heavy diesel fuel. The non-renewable feedstock may further be one converted from peat, lignin or biomass for conversion into a syngas rich in hydrogen and carbon monoxide which is then subjected to a Fischer-Tropsch synthesis and fractionation.

The biomass is typically porous and may be in the form of solid particles. The biomass particles can be fibrous biomass materials such as cellulose. Examples of suitable cellulose-containing materials include algae, paper waste, and/or cotton linters. In one embodiment, the biomass particles can comprise a lignocellulosic material. Examples of suitable lignocellulosic materials include forestry waste such as wood chips, wood slag, saw dust, pulping waste, bark, and tree branches; agricultural waste such as corn stover, wheat straw, and bagasse; and/or energy crops such as eucalyptus, switch grass, and coppice; as well as municipal water, such as yard waste, paper and cardboard. The biomass may also be lignins or hemicelluloses. The biomass may be in a solid or finely divided form or may be a liquid. Typically, the water soluble content of the biomass is no greater than about 7 volume percent.

The amount of biomass in the filter aid may be at least 50 weight percent, at least 75 weight percent, or at least 90 weight percent. Typically, the height of the filter aid between from about 0.5 to about 10 feet; more typically from about 0.5 to 1 feet; and most typically from about 3 mm to about 7 mm.

The used catalyst in the filter aid may be any catalyst employed in the thermocatalytic conversion of biomass into bio-oil. Such catalysts may be a particulate material, or may be dissolved in a suitable solvent. A combination of a particulate catalytic material and a dissolved catalytic material may also be used. Such catalytic materials include mixed metal oxides, layered cationic materials, and hydrotalcite-like materials as well as combinations of an alkali metal carbonate clays, refractory materials such as alumina, and a hydrotalcite-like material (including hydrotalcite per se).

Other catalysts may be crystalline aluminosilicates, such as zeolites. Often preferred catalysts are the carbonates, hydroxides and oxides of alkali and earth alkaline metals, in particular NaOH, KOH, sodium carbonate and potassium carbonate.

Typically, the average particle size of the refractory oxide farthest from the biomass is between from about ⅛" to about ¼" and the average particle size of the refractory oxide closest to the biomass is between from about 120 to about 500 microns.

Typically, the filter media described herein is one wherein the used catalyst is disposed between two layers of biomass.

Referring to FIG. 1, filter media 10 is shown as comprising biomass 12 and used catalyst 14. Used catalyst 14 may be arranged within filter media 10 by average particle size such that the used catalyst of the largest average particle size is adjacent to the biomass and the used catalyst of the smallest average particle size is farthest from biomass.

Using biomass as a component of the filter aid makes it feasible to recycle the spent biomass filter aid for bio-oil production and/or as a combustion heat resource instead of waste disposal as with a conventional filter aid.

In an embodiment, at least a portion of the feedstock is introduced into a centrifuge with the filter media. Undesirable solid components are then removed from the feedstock as the feedstock is passes through the filter media during centrifugation. The undesirable solids are entrapped into or onto the used catalyst of the filter media.

Alternatively, filter media 10 may be disposed within filtration bed 16. As illustrated in FIG. 1, filter media 10 is typically disposed between a first packing material 18 and second packing material 20.

First packing material 18 may be composed of two or more layers of a substance suitable for supporting filter media 10 during the removal of the unwanted solids. Typically, the height of the first packing material and the second packing material is from about ⅛ inch to 2 feet.

As illustrated in FIG. 1, first packing material 18 is shown consisting of two layers, 18a and 18b. Likewise second packing material 20 may be composed of two or more layers of a substance suitable for supporting filter media 10 during the removal of the unwanted solids. In FIG. 1, second packing material 20 is shown as consisting of two layers, 20a and 20b.

In a preferred embodiment, interstitial layer 22 may be used to separate first layer 18a from 18b of first packing material 18. Interstitial layer 24 may be used as well to separate first layer 18a from biomass 12. An interstitial layer 26 may further be used to separate layer 20a and 20b of second packing material 20. Interstitial layer 28 may be used to separate first layer 20a of second packing material 20 from biomass 12.

While FIG. 1 illustrates the use of two layers of packing materials, it will be understood that more than two layers of packing materials may be used. For instance, filtration bed 16 may be composed of three or more layers of first packing material 18 and/or three or more layers of second packing material 20. Between each layer may be disposed an interstitial layer.

The interstitial layer may be composed of any inert material capable of providing separation between layers of packing material or between the packing material and the biomass intact during the continuous removal of the unwanted solids from the fuel feedstock. In an embodiment, the interstitial layer may be wire mesh, glass wool as well as glass wool in between layers of wire mesh. Typically, the height of the interstitial layer is between from 1 mm to about 100 mm; more typically between from about 1 mm to about 10 mm; and still more typically between from about 1 mm to about 3 mm.

An interstitial layer (other the interstitial layer between the first packing layer and biomass or second packing layer and biomass, shown as 24 and 28 in FIG. 1) may be a thin layer of biomass.

The packing material is typically a refractory oxide. In one embodiment, the refractory oxide is alumina, activated alumina, ceramic ball or activated carbon.

The packing material is of suitable shape and size to provide the requisite support to the filter media. In one embodiment, the packing material is spherical though other geometric shapes may be acceptable. When two or more layers of packing material is used, each of the layers typically contains a packing material of similar geometric shape though adjacent layers of packing material may be of different geometric shape.

Where two or more layers of packing material are used, it is typically desirable that the average particle size of the particles forming the different layers to be of different size. Desirably, the packing material farthest from the biomass is of larger average particle size than the packing material closest to the biomass. Referring to FIG. 1, layer 18a of first packing material 18 and layer 20a of second packing material 20 are smaller in size than layer 18b of first packing material 18 and layer 20b of second packing 20a, respectively. In one embodiment, the average particle size of the packing material forming layer 18b and 20b in FIG. 1 may be between from about 4 mm to about 7 mm and the average particle size of the packing material forming layer 18a and 20a may be between from about 0 to ½ inches and is typically between from about 120 to about 500 microns.

In those instances where three or more layers of packing material are used, the average particle size of the packing material in each of the layers may be graded such that the average particle size of the packing material farthest from the biomass is of the largest average particle size and the packing material closest to the biomass is of the smallest size and the layers in between decreasing in particle size as the packing material gets closes to the biomass.

The flow of fuel feedstock is shown in FIG. 1 as proceeding from the top of filtration bed 16 through entry port 30 and exiting filtration bred 16 with unwanted solids removed through exit port 32.

In an embodiment of the disclosure, the filter media and packing material are symmetrically arranged within the filtration bed. Referring to FIG. 1, filter media 10 and first packing material 18 and second packing material 20 is symmetrically arranged in filtration bed 16. In light of the symmetrical arrangement of the components within the filtration bed, the flow of fuel feedstock into the filtration bed may be reversed during the process.

The reversal in the flow of fuel feedstock into the filtration bed may be effectuated by flipping the filtration bed such that entry port 30 now becomes the exit for the treated fuel feedstock and the exit port 32 now becomes the entry port for the untreated fuel feedstock.

Alternatively, referring to FIG. 2, the reversal in the flow of fuel feedstock into filtration bed 16 may be effectuated by the filtration bed having a first entry port 34 the fuel feedstock at one end of filtration bed 16 with the first exit port 38 at the opposite end of the filtration bed and a second entry port 36 for the fuel feedstock at one end of filtration bed 16 and a second exit port 40 at the other end. As illustrated each end of filtration bed 16 has an entry port for untreated fuel feedstock and an exit port for treated fuel feedstock. Thus, when the flow rate through the filtration bed of untreated fuel feedstock is no longer commercially or economically acceptable, the exit port of one end of the filtration may be closed and the entry port for opened. Referring to FIG. 2 then, where the flow rate of untreated fuel feedstock is desired to be reversed, first entry port 34 for the untreated feedstock and first exit port 38 are closed such that treated feedstock no longer flows through the filtration bed from first entry port 34 to first exit port 38. Second entry port 36 is then opened such that flow of untreated feedstock may precede though filter media 10 and exit filtration bed 16 through second exit port 40.

The reversal of flow rate of the fuel feedstock through the filtration bed may be performed multiple times during the treatment cycle of a fuel feedstock. When the flow rate through the filtration bed is no longer acceptable after the flow rate has been reversed, the filter media within the filtration bed may be replaced. Since the biomass and the used catalyst are used in a biomass conversion reactor, the biomass and/or catalyst from the filtration bed may be recycled into the biomass conversion reactor. The process of the disclosure thus offers a cost effective method for the treatment of fuel feedstocks since the components of the filter media are completely recyclable.

In an embodiment of the disclosure, more than one filtration bed may be used. FIG. 3 illustrates an embodiment of the disclosure wherein a series of filtration beds may be used in order to maximize the efficiency of the process. As illustrated, the filtration bed 16a, 16b, 16c, 16d, 16e and 16f may be arranged in a series. In the multi-stage arrangement, illustrated in FIG. 3(a), the flow of fuel feedstock is shown in FIG. 3 as proceeding from the top of filter bed 16a through entry port 42 and exiting filter 16f with unwanted solids removed through exit port 44. When a series of filtration beds are used, the majority of the unwanted solids are removed within the filtration units at the beginning of the series. The filtration units farther in the series capture less unwanted solids as the amount of unwanted solids decreases as the fuel feedstock moves through the series of beds. To maximize the efficiency of the process, the flow rate of the fuel feedstock may be reversed such that the entry port for the untreated fuel feedstock now becomes the exit port for the treated feedstock and the exit port for the treated fuel feedstock now becomes the entry port for untreated fuel feedstock.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

EXAMPLES

A fuel feedstock was introduced into a filtration bed as shown in FIG. 1 wherein the biomass was Kenaf and wherein biomass 12 and packing layer 18a was separated by a screen/glass wool sandwich and wherein biomass 12 and packing layer 20a was separated by a screen/glass wool sandwich. The amount of solids and ash of the unfiltered feedstock was determined by a standard testing protocol and the results are set forth in Table 1. The amount of water in the biomass is represented as the KF %. Packing layer 18a and 20a were 125 μm activated alumina and ⅛" spherical alumina balls, respectively. Packing layer 18b and packing layer 20b were ⅛" and ¼" alumina balls, respectively. Each of layers 18a, 18b, 20a and 20b were ½" in height. The height of the spent catalyst was ⅓" and the height of the filtration media was 2.5". A thin layer of biomass was used to separate 18a from 18b and 20a from 20b. The diameter of the filtration bed was either ½" or 1". The results demonstrate a filter efficiency of solids to be 91.4% and the filter efficiency on dissolved metals to be 69.5%. The ICP analysis of the feed and the results after passing the feed through the filtration bed is further shown below in Tables 2, 3 and 4.

TABLE 1

| Solids by Filtration (ppm) | | | Ash (ppm) | |
|---|---|---|---|---|
| Analysis #1 | Analysis #2 | Average | ASTM D482 | ICP |
| 2,093 | 1,726 | 1,910 | 821 | 1,277 |

TABLE 2

Diameter: ½"
Conditions: 125° F./100 psi

| Solids by Filtration (ppm) | | | Ash by ICP | | |
|---|---|---|---|---|---|
| Before (feed) | After (prod) | Filter Efficiency[a] | Before (feed) | After (prod) | Filter Efficiency |
| 1,910 | 97 | 94.9% | 1,277 | 396 | 69.0% |

[a]Filter Efficiency (Solids) = [Solids (feed) − Solids (product)]/Solids (feed)
[b]Filter Efficiency (Ash) = Ash (feed) − Ash (product)]/Ash (feed)

TABLE 3

Diameter: 1"
Conditions: room temperature/100 psi
Solids by Filtration (ppm)

| Before (feed) | After (prod) | Filter Efficiency[a] |
|---|---|---|
| 1,910 | 119 | 93.8% |

[a]Filter Efficiency (Solids) = [Solids (feed) − Solids (product)]/Solids (feed)

TABLE 4

| | | | (Second Cycle) | | |
|---|---|---|---|---|---|
| Diameter: 1" | | | (Conducted after 1st cycle and | | |
| Conditions: room temperature/100 psi | | | flipping filter upside down) | | |
| Solids by Filtration (ppm) | | | Ash by ASTM D482 | | |
| Before (feed) | After (prod) | Filter Efficiency[a] | Before (feed) | After (prod) | Filter Efficiency[b] |
| 1,910 | 275 | 85.6% | 821 | 250 | 69.5% |
| Average Calculation of Solids by Filtration | | | Average Calculation of Ash (ICP and D482) | | |
| 94.9% | 93.8% | 85.6% | | 69.0% | 69.5% |
| | Ave --> | 91.4% | | Ave --> | 69.3% |

[a]Filter Efficiency (Solids) = [Solids (feed) − Solids (product)]/Solids (feed)
[b]Filter Efficiency (Ash) = Ash (feed) − Ash (product)]/Ash (feed)

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

While exemplary embodiments of the disclosure have been shown and described, many variations, modifications and/or changes of the system, apparatus and methods of the present disclosure, such as in the components, details of construction and operation, arrangement of parts and/or methods of use, are possible, contemplated by the patent applicant(s), within the scope of the appended claims, and may be made and used by one of ordinary skill in the art without departing from the spirit or teachings of the disclosure and scope of appended claims. Thus, all matter herein set forth or shown in the accompanying drawings should be interpreted as illustrative, and the scope of the disclosure and the appended claims should not be limited to the embodiments described and shown herein.

What is claimed is:

1. A method of removing undesirable solid components from a fuel feedstock stream, the method comprising:
    (a) passing at least a portion of the feedstock stream through a filter media comprising:
        (i) biomass; and
        (ii) catalyst used from the thermocatalytic conversion of biomass into bio-oil; and
    (b) removing the undesirable solid components from the fuel feedstock stream.

2. The method of claim 1, wherein the catalyst is disposed between two layers of biomass.

3. The method of claim 1, wherein the used catalyst is arranged within the filter media by average particle size such that the used catalyst of the largest average particle size is adjacent to the biomass and the used catalyst of the smallest average particle size is farthest from biomass.

4. The method of claim 1, wherein at least one of the following conditions prevail:
    (a) the fuel feedstock stream is a feedstock stream of a renewable fuel or a non-renewable fuel;
    (b) the at least a portion of the feedstock stream and the filter media is introduced into a centrifuge and further wherein the at least a portion of the feedstock stream passes through the filter media in the centrifuge; or (c) the filter media is disposed between a first packing material and a second packing material to form a filtration bed.

5. The method of claim 4, wherein in condition (b) the catalyst of the filter media is disposed between two layers of biomass.

6. The method of claim 4, wherein in condition (c) the filter media and the packing material are symmetrically arranged within the filtration bed.

7. The method of claim 6, wherein either:
(a) the direction of flow rate of the at least a portion of the feedstock stream is reversed during the removal of the undesirable solid components; or
(b) the at least a portion of feedstock stream is passed through a series of filtration beds and wherein each filtration bed within the series comprises filter media and packing material symmetrically arranged within the bed.

8. The method of claim 7, wherein in (a) the direction of flow rate of the at least a portion of the feedstock stream is reversed repeatedly during the removal of the undesirable solid components and, optionally, the filter media within the filtration bed is replaced after the flow rate of the at least a portion of the feedstock stream is diminished.

9. The method of claim 4, wherein at least one of the following conditions prevail:
(a) after at least a portion of the feedstream stock is passed through the filter media, the biomass of the filter media is introduced into a biomass conversion reactor and wherein the biomass is converted into bio-oil in the biomass conversion reactor;
(b) after at least a portion of the feedstream stock is passed through the filter media, the used catalyst and the biomass of the filter media is introduced into a biomass conversion reactor and wherein the biomass is converted into bio-oil in the biomass conversion reactor; or
(c) after at least a portion of the feedstream stock is passed through the filter media, the used catalyst is introduced into a biomass conversion reactor.

10. A method of removing undesirable solid components from a fuel feedstock stream, the method comprising passing at least a portion of the feedstock stream through a filtration bed having a filter media comprising (a) biomass and (b) catalyst used from the thermocatalytic conversion of biomass into bio-oil; and (c) removing the undesirable solid components from the fuel feedstock stream.

11. The method of claim 10, wherein the catalyst is disposed between two layers of biomass.

12. The method of claim 10, wherein the filter media is disposed between a first packing material and a second packing material.

13. The method of claim 12, wherein the first packing material comprises at least two layers of packing substance.

14. The method of claim 13, wherein the at least two layers of packing substance of the first packing material are separated by an interstitial layer.

15. The method of claim 14, wherein the interstitial layer is composed of wire mesh, glass wool, glass wool sandwiched by wire mesh or biomass.

16. The method of claim 15, wherein either:
(a) the height of the interstitial layer is between from about 1 mm to about 100 mm; or
(b) the height of the first packing material and/or second packing material interstitial layer of biomass is between 1/8 inch to 2 feet.

17. The method of claim 12, wherein at least one of the following conditions prevail:
(a) the first packing material has at least two layers of first packing material and the second packing material has at least two layers of a second packing material; or
(b) the filter media and the packing material are symmetrically arranged within the filtration bed.

18. The method of claim 17, wherein the first packing material and second packing material are composed of a refractory oxide.

19. The method of claim 18, wherein at least one of the following conditions prevail:
(a) the refractory oxide is activated alumina;
(b) the at least two layers of first packing material and the at least two layers of second packing material are of different average particle sizes; or
(c) the at least two layers of first packing material and the at least two layers of second packing material are spheres.

20. The method of claim 19, wherein the at least two layers of the first packing material and the at least two layers of second packing material are spheres of a refractory oxide.

21. The method of claim 20, wherein the refractory oxide is alumina.

22. The method of claim 19, wherein the at least two layers of first packing material and the at least two layers of second packing material are spheres and/or the packing material farthest from the biomass is of larger particle size than the packing material closest to the biomass.

23. The method of claim 22, wherein the spheres are alumina spheres.

24. The method of claim 23, wherein the average particle size of the refractory oxide farthest from the biomass is between from about 1/8" to about 1/4" or the average particle size of the refractory oxide closest to the biomass is between from about 120 to about 500 microns.

* * * * *